No. 623,986. Patented May 2, 1899.
H. W. COLBY.
APPARATUS FOR RACKING BEER.
(Application filed Dec. 21, 1896.)
(No Model.) 3 Sheets—Sheet 1.
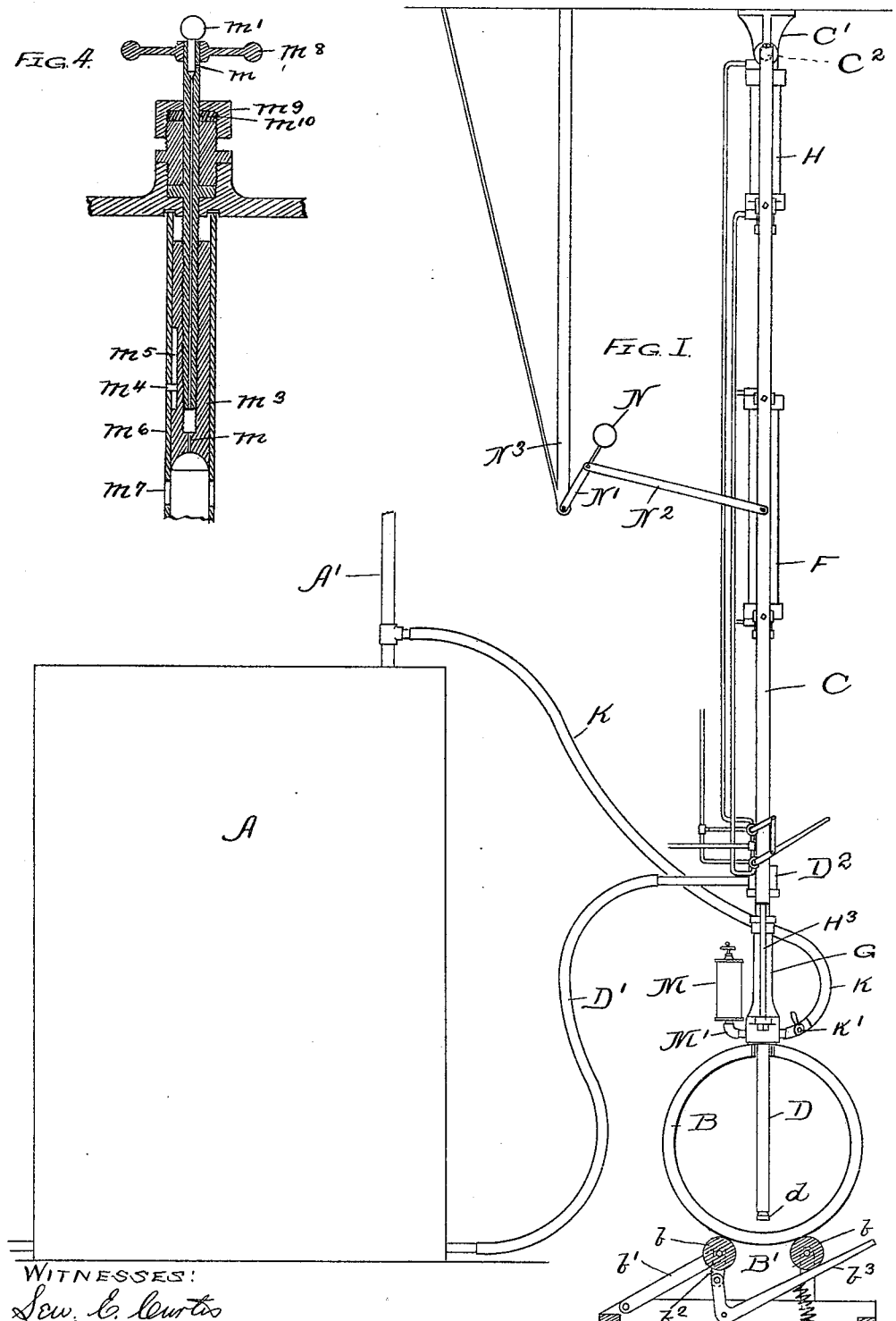

No. 623,986. Patented May 2, 1899.
H. W. COLBY.
APPARATUS FOR RACKING BEER.
(Application filed Dec. 21, 1896.)
(No Model.) 3 Sheets—Sheet 2.
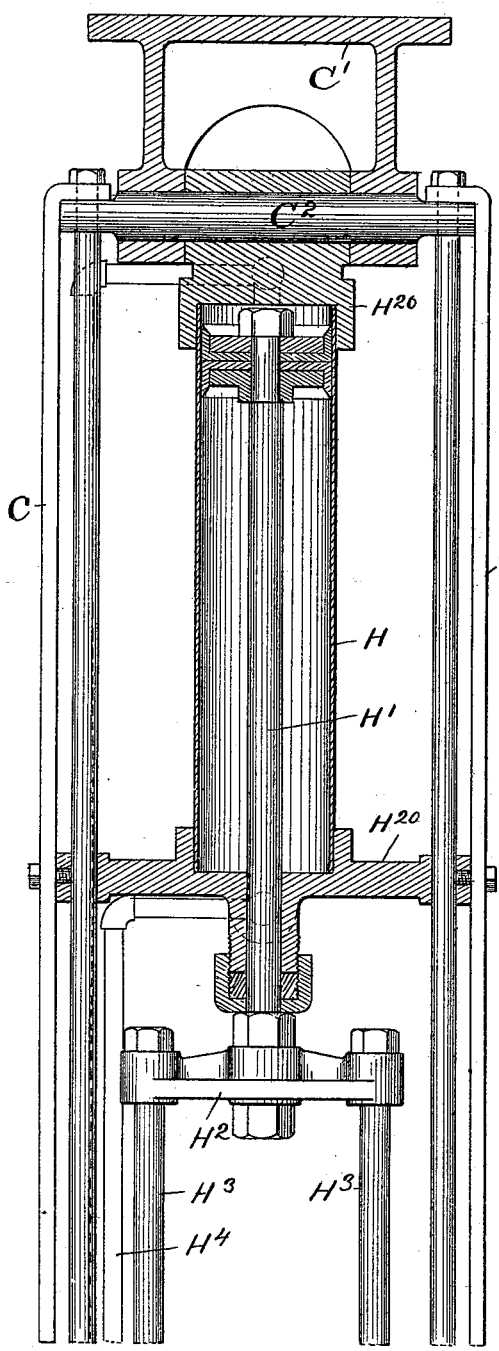
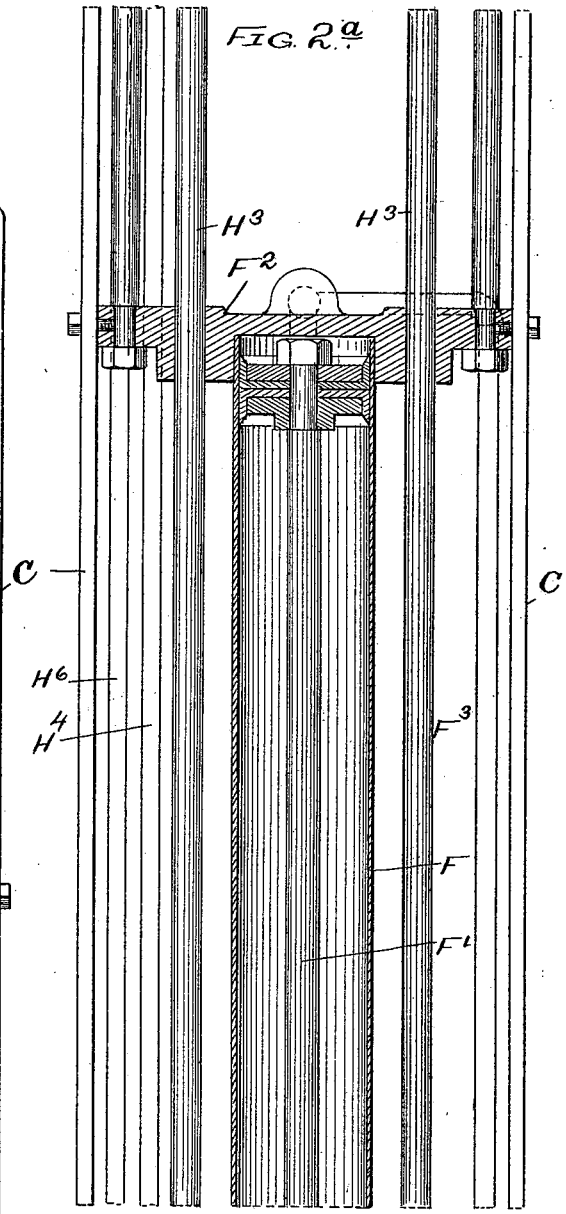
WITNESSES:
Geo. C. Curtis
H. W. Munday
INVENTOR:
HARRY W. COLBY
BY Munday, Evarts & Adcock.
HIS ATTORNEYS.

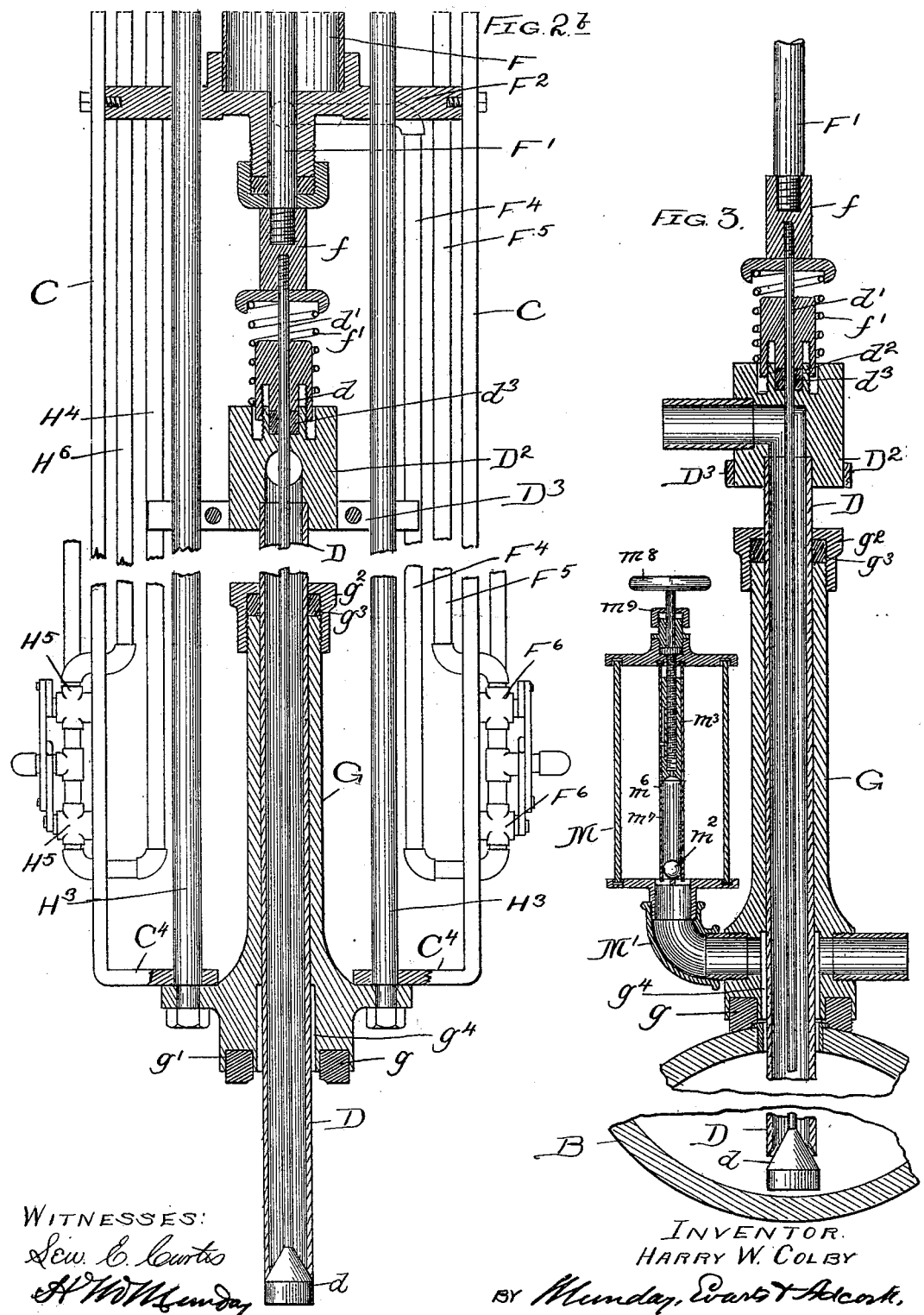

UNITED STATES PATENT OFFICE.

HARRY W. COLBY, OF CHICAGO, ILLINOIS.

APPARATUS FOR RACKING BEER.

SPECIFICATION forming part of Letters Patent No. 623,986, dated May 2, 1899.

Application filed December 21, 1896. Serial No. 616,386. (No model.)

*To all whom it may concern:*

Be it known that I, HARRY W. COLBY, a citizen of the United States, residing in Chicago, in the county of Cook and State of Illinois, have invented a new and useful Improvement in Apparatus for Racking Beer, of which the following is a specification.

My invention relates to improvements in the art of and apparatus for racking beer.

Heretofore the method usually employed for racking or drawing off beer from the tank or tub into barrels or kegs preparatory to shipment has been to force the beer out of the tank or tub under pressure through a suitable hose or pipe, the end of which is loosely inserted into the barrel or keg at its bung. As the beer is thus forced into the barrel under pressure it tends to foam, and in order to fill the barrel full, as required, it is necessary to allow the foam to flow out through the bung for some little time or until the beer begins to run out clear in liquid form. The beer thus overflowing the barrel, either in the form of foam or in a liquid form, is collected by troughs and requires to be again worked over before it can be used, thus entailing considerable loss, besides rendering the racking process inconveniently sloppy and disagreeable.

The object of my invention is to provide a simple and efficient apparatus by which beer may be racked or drawn off from the tank or tub into barrels or kegs, whereby the barrels or kegs may be filled completely full without causing the beer to foam and without any loss or overflow. To accomplish this result, I force the beer from the tank into the barrel under pressure and at the same time maintain a pressure in the barrel on the beer therein as it fills into the same equaling or approximating the pressure on the beer in the tank, while at the same time the air in the barrel is allowed to escape therefrom as the barrel fills with the liquid. In this way or by this means the beer is prevented from foaming as it is discharged into the barrel. To enable the barrel to be filled completely full without any waste or overflow, I force out of the barrel into a closed receptacle, which is connected with the barrel through the bung, a sufficient quantity of beer to equal or approximate that displaced by the filling-pipe within the barrel and which flows back into the barrel as the filling-pipe is withdrawn, thus leaving the barrel full. To automatically stop the flow of the beer from the tank into the barrel when the barrel becomes full, the air-vent is automatically closed by a float-valve when the liquid rises to the required height.

In the accompanying drawings, which form a part of this specification and in which similar letters of reference indicate like parts throughout all the views, Figure 1 is a side elevation or diagram view of an apparatus embodying my invention. Figs. 2, 2ª, and 2ᵇ, taken together, are a central vertical longitudinal section of the apparatus, Fig. 2 representing the upper portion, Fig. 2ª the intermediate portion, and Fig. 2ᵇ the lower portion, of the same. Fig. 3 is a vertical cross-section of the portion shown in Fig. 2ᵇ. Fig. 4 is an enlarged vertical section showing the vent for the escape of air from the barrel as it is being filled.

In the drawings, A represents the tank or closed tub from which the beer is to be racked or drawn into the barrel or keg B.

A' is a pipe leading to an air-pump or other means for maintaining the beer in the tank A under pressure, the pressure being ordinarily or preferably about five pounds to the square inch.

C is a movable and preferably a swinging frame supported from the ceiling to enable it to be conveniently swung into position over the barrel B and barrel rack or support B'.

C' is a bracket attached to the ceiling and to which the frame C is hinged by a pivot-pin C².

D is the filling-pipe, the same being mounted movably on the frame C, so that it may be reciprocated into and out of the barrel. It is connected to the tank A through a flexible pipe or hose D' and a suitable union or connection D². The pipe D is furnished with a valve $d$ at its lower end. To move or reciprocate the filling-pipe D and its valve $d$ into and out of the barrel, I prefer to employ a hydraulic cylinder F, the piston or piston-rod F' of which is connected by a suitable coupling $f$ with the valve-stem $d'$ of the valve $d$. The coupling or union D², to which the filling-pipe D is directly attached, is adapted to slide on the valve-stem $d'$ sufficiently to permit the opening and closing of the valve, a spring $f'$, interposed between the coupling $f$ and the union $D^2$, serving to hold the valve normally closed. Secured to the union $D^2$ is a stop-plate $D^3$, which is adapted to abut against the lower end of the frame C at $C^4$, and thus limit the downward movement of filling-pipe D, while the valve $d$ is permitted, through the interposed spring $f'$, to move a limited extent farther to open the valve. A stuffing-box $d^2$ and packing $d^3$ are provided in the union $D^2$ at the upper end thereof where the valve-stem $d'$ passes through to prevent the escape of beer around the valve-stem.

G is a sealing sleeve or tube surrounding the filling-pipe D and by means of which the barrel, keg, or other package B being filled is sealed air-tight around its bung at and during the time the beer is being forced into it. This sealing-sleeve is provided at its lower end with a sealing-ring $g$, preferably of rubber and fitted in an annular channel $g'$, with which the sealing-sleeve G is provided at its lower end. To form an air-tight joint between the sealing-sleeve G and the filling-pipe D, while permitting the two to slide or reciprocate in respect to each other, I provide the sealing-sleeve G with a stuffing-box $g^2$ and packing $g^3$. The sealing-sleeve G is mounted movably or to reciprocate on the frame C to adapt it to be forcibly pressed and held against the barrel B, and thus seal the same liquid-tight around the bung. For thus actuating or operating the sealing-sleeve I prefer to employ a hydraulic cylinder H, the piston or piston-rod H' of which is connected by any suitable means, but preferably by a cross-head $H^2$ and connecting-rods $H^3$, to the sealing-sleeve G.

K is an air-pipe leading from the upper part of the tank A and communicating with the interior of the barrel through the sealing-sleeve G, said sealing-sleeve being provided with an interior enlargement or channel $g^4$, surrounding the filling-pipe D, so as to thus afford a free air communication between the tank A and the barrel B. The beer in the barrel B as the barrel fills is thus maintained under substantially the same pressure on its surface as that in the tank A. The beer will therefore flow from the tank A into the barrel B without any tendency to foaming. The air-pressure in the barrel B, it should, however, be understood, can never exceed and will generally be slightly less than that in the tank A, owing to the vent about to be described. The air-pipe K is provided with a valve K' for opening and closing it.

M is a supplemental closed receptacle or vessel connected with the sealing-sleeve G, and through it with the barrel, and which is provided with an air-vent $m$, having a safety-valve or weighted or spring-held valve $m'$, through which the air in the barrel escapes, as the barrel fills with beer, whenever the pressure within the barrel exceeds the limit to which the safety-valve $m'$ is set. The vessel M is thus connected with the sealing-sleeve G and with the interior of the barrel, preferably by a union or coupling M', the sealing-sleeve G having an interior channel $g^4$ surrounding the filling-pipe D, as is clearly shown in Figs. 3 and $2^b$. After the barrel becomes filled with beer the liquid will itself be forced up through this channel $g^4$ and union M' into the vessel M, which should be made sufficiently large to be capable of containing enough beer to represent that displaced by the filling-pipe D within the barrel, and to automatically close the air-vent $m$, and thus arrest the further flow of beer into the barrel B and vessel M at the proper moment, I provide a float-valve $m^2$ for closing the vent $m$ at the lower end by the rise of the liquid itself in said vessel M. As the filling-tube D is inserted into the barrel near to the bottom thereof, as indicated in Fig. 3, to prevent any fall of liquid that would tend to cause foaming and as the amount of displacement of the filling-pipe will thus vary more or less with the diameter or size of the barrel or package, I make the vent $m$ in two separate parts or tubes and the lower part $m^3$, against which the float-valve $m^2$ seats itself, adjustable on the upper part $m$. To effect this adjustment, the vent-tube parts $m^3$ and $m$ are preferably screw-threaded together, as indicated in Fig. 4. The adjustable tube $m^3$ is prevented from turning, while permitted to move up and down, by a pin $m^4$, which fits in a longitudinal slot $m^5$, the pin being secured to the tube $m^6$, which serves as a guide or cage for the float-valve $m^2$. The tube $m^6$ has openings $m^7$ to communicate with the vessel M. The vent-tube $m$ is furnished with a handle or thumb-piece $m^8$ for turning it and with a stuffing-box $m^9$ and packing-ring $m^{10}$.

The hydraulic cylinder F is supported on or secured to suitable cross-pieces $F^2$ on the frame C and the hydraulic cylinder H on a suitable cross-piece $H^{20}$ on said frame.

To cause the swinging frame C to remain swung to one side while the barrels or packages are being placed on and removed from the rack or support B', I provide a counter-balance N, secured to a pivoted arm N', which is connected by a link $N^2$ with the frame C. The counterbalance-arm N' is pivoted to a bracket $N^3$, attached to the ceiling.

$F^4$ $F^5$ are the water-pipes leading to the hydraulic cylinder F, the same being opened and closed as desired by three-way valves $F^6$, one for each end of the cylinder through a suitable valve-lever, so that the piston F' may be positively moved in either direction as required.

The water-pipes $H^6$ $H^4$ of the hydraulic cylinder H are opened and closed by similar three-way valves $H^5$, one for each end of the cylinder, so that the piston H' may be positively moved in either direction as desired.

The operation is as follows: The barrel being in place on its support B', the frame C is first swung into position over it. The filling-pipe D is then inserted into the barrel by the operation of the hydraulic cylinder and piston F F' and the sealing-sleeve G forced down against the barrel by the operation of the hydraulic cylinder and piston H H', thus sealing the barrel. The operator then opens the valve K' in the air-pipe K, and at the same time gives a slight further movement to the piston F', that operates the valve-stem $d'$, thus opening the valve of the filling-pipe. The beer then flows from the tank A into the sealed barrel, the beer being maintained during this operation under substantially the same pressure in the tank A and the barrel B by reason of the safety-valve $m'$ and of the air communication leading from the upper part of one to the upper part of the other, having been opened until the barrel B is filled with air under pressure, while the beer is delivered into the lower part of the barrel by reason of the filling-pipe D reaching near the bottom of the barrel. During this operation as the barrel fills with beer the air escapes through the vent $m$. After the barrel is filled with the beer the same rises into the vessel M to the height at which the float-valve $m^2$ seats itself against the lower end of the vent-tube and continues to rise after the vent is thus closed until the pressure in the vessel M becomes sufficient to cause the further flow of beer from the tank A to cease. At this time the vessel M and its connections with the barrel B will contain just sufficient beer to equal the displacement due to the presence of the filling-tube D in the barrel B. Through the hydraulic cylinder and piston F F' the operator then withdraws the filling-tube and its valve from the barrel, while the barrel is still held sealed by the sealing-sleeve G, the first upward movement of course closing the valve $d$ against the valve-seat at the lower end of the filling-tube. As the filling-tube is thus being withdrawn from the barrel the beer in the vessel M and its connections flows back into the barrel. The sealing-sleeve G is then lifted from the barrel and the frame C swung to one side, and the barrel is then ready to be bunged and removed. The valve K' in the air-pipe K needs to be left open only long enough to fill the barrel with air under pressure, and thus equalize the pressure in the tank A and barrel or package B, and this valve is preferably closed as soon as this is accomplished. It should be closed as soon as the air begins to escape from the barrel through the vent $m$ and safety-valve $m'$. The point at which the safety-valve should be adjusted to open should be at such pressure as will permit the beer to flow readily from the tank A into the barrel B. As the valve $d$ is located at the lower end of the filling-pipe D, it will be observed that the filling-pipe is kept constantly filled with beer throughout its whole length, so that when the valve $d$ is opened there can be no falling or dropping of the beer in the filling-pipe of such nature as to cause splashing or foaming, it being of course understood that the valve $d$ is not opened until the filling-pipe D is fully inserted into the barrel or package and its lower end thus brought near the bottom or lower interior surface of the package. To facilitate the ready removal of the filled package B from its support B', I provide the support with rollers $b$ $b$, upon which the barrel directly rests, and mount one of these rollers on the pivoted arm or lever $b'$, which is connected by a link $b^2$ with a treadle or bent lever $b^3$, so that the operator by pressing down on the treadle with his foot can readily and quickly lift or roll the barrel out of the cradle of the support. As the flow of beer into the barrel is automatically stopped by the closing of the vent through the rise of the beer itself in the supplemental vessel or receptacle M to the required height the moment the barrel or package becomes filled and as no beer can escape from the barrel or from the apparatus, it is obvious that my apparatus does not require any close watching or attention on the part of the operator. This automatic shut-off of the flow of the beer into the barrel when the barrel is full by thus dispensing with the constant watching of the attendant to see when the barrel is full enables one man to successfully operate four or five or more of the apparatus. I thus secure by my invention a great saving in labor, as well as the other results hereinbefore mentioned.

I claim—

1. In a beer-racking apparatus, the combination with a movable filling-pipe adapted to be inserted into the package, with an independently-movable sealing-sleeve surrounding said filling-pipe for sealing the package around its bung, and provided with an interior air-channel leading to the interior of the barrel, and an air-pipe or connection leading from said sealing-sleeve to the upper portion of the tank, and a sealed receptacle or vessel connected with said sealing-sleeve and provided with an air-vent and safety-valve to permit the escape of air from the barrel or package as it is filled, a frame upon which said sealing-sleeve and filling-pipe are mounted to reciprocate, mechanism for reciprocating said filling-pipe and independent mechanism for reciprocating said sealing-sleeve and holding or sealing it to the bung, whereby on the withdrawal of the filling-pipe from the barrel the liquid which has risen into said closed receptacle or vessel may flow back into the barrel, substantially as specified.

2. In a beer-racking apparatus, the combination with a movable filling-pipe adapted to be inserted into the package, with an independently-movable sealing-sleeve surrounding said filling-pipe for sealing the package around its bung, and provided with an interior air-channel leading to the interior of the barrel, and an air-pipe or connection leading from said sealing-sleeve to the upper portion of the tank, and a closed receptacle or vessel connected with said sealing-sleeve and provided with an air-vent and safety-valve to permit the escape of air from the barrel or package as it is filled, and a float-valve in said closed vessel or receptacle for automatically closing said vent by the rise of the beer or liquid therein when the package becomes filled and thus automatically shutting off the flow, a frame upon which said sealing-sleeve and filling-pipe are mounted to reciprocate, mechanism for reciprocating said filling-pipe and independent mechanism for reciprocating said sealing-sleeve and holding or sealing it to the bung, whereby on the withdrawal of the filling-pipe from the barrel the liquid which has risen into said closed receptacle or vessel may flow back into the barrel, substantially as specified.

3. In a beer-racking apparatus, the combination with a movable filling-pipe adapted to be inserted into the barrel or package, of a valve at the lower end of said pipe, a valve-stem connected to said valve, a power-operated mechanism connected to said valve-stem for automatically reciprocating said valve in respect to said filling-pipe, and a connection between said valve-stem-reciprocating mechanism and said filling-pipe for automatically moving said filling-pipe and stem into and out of the barrel, substantially as specified.

4. In a beer-racking apparatus, the combination with a movable filling-pipe adapted to be inserted into the barrel or package through its bung, with an independently-movable sealing-sleeve surrounding said filling-pipe a valve at the lower end of said filling-pipe for opening and closing it, power-operated mechanism for automatically reciprocating said sealing-sleeve and holding it against the bung, power-operated mechanism for automatically opening and closing said valve, and power-operated means for automatically moving the filling-pipe into and out of the barrel, substantially as specified.

5. In a beer-racking apparatus, the combination with a movable filling-pipe adapted to be inserted into the barrel or package through its bung, with an independently-movable sealing-sleeve surrounding said filling-pipe, and a supplemental closed vessel connected with the interior of the barrel or package and provided with an air-vent and safety-valve, said vent having also a float-valve for closing the vent by the rise of the beer or liquid in said supplemental vessel and thus automatically shutting off the flow of beer into the barrel or package when it is full, said supplemental vessel being adapted to contain a sufficient quantity of beer or liquid to compensate for the displacement of the filling-pipe within the barrel or package so that as the filling-pipe is withdrawn from the package the beer or liquid in the supplemental vessel may flow back into the package and thus leave it completely or substantially full, said vent having an adjustable seat or tube for said float-valve to adapt the apparatus for different sizes of packages or different amounts of displacement of the filling-pipe therein, substantially as specified.

6. In a beer-racking apparatus, the combination with a suspended swinging frame adapted to be swung into position over the barrel, with a filling-pipe, and sealing-sleeve mounted to reciprocate on said frame, a hydraulic cylinder and piston for operating the sealing-sleeve, and a second hydraulic cylinder and piston for operating the filling-pipe, substantially as specified.

7. In a beer-racking apparatus, the combination with a movable filling-pipe having a valve at its lower end with a cylinder and piston for inserting and withdrawing the filling-pipe from the barrel or package and opening and closing said valve, the stem of the valve being directly connected with said piston, and a spring being interposed in the connection between the valve-stem and the filling-pipe to permit a slight movement of the valve and its stem after the filling-pipe is moved to its final or lowermost position, substantially as specified.

8. In a beer-racking apparatus, the combination with a movable filling-pipe having a valve at its lower end with a cylinder and piston for inserting and withdrawing the filling-pipe from the barrel or package and opening and closing said valve, and a spring being interposed in the connection between the valve-stem and the filling-pipe to permit a slight movement of the valve and its stem after the filling-pipe is moved to its final or lowermost position, and a stop to limit the downward movement of the filling-pipe, substantially as specified.

9. The combination with a suspended swinging frame C, of the filling-pipe D having a valve $d$ at its lower end, an independently-movable sealing-sleeve G, and mechanism for operating said filling-pipe and its valve and said sealing-sleeve, and a lever and counterbalance for holding said swinging frame to one side to enable the barrels or packages to be more conveniently placed on and removed from the support therefor, substantially as specified.

10. In a beer-racking apparatus, the combination with a support for the barrel or package of a swinging frame suspended above said support, and a filling-pipe mounted to reciprocate upon said swinging frame, and a counterbalance and lever for holding said swinging frame to one side, substantially as specified.

11. In a beer-racking apparatus, the combination with a support for the barrel or package of a swinging frame suspended above said support, and a filling-pipe mounted to reciprocate upon said swinging frame, said support for the barrel or package being provided with a movable arm or lever and an operating treadle or lever for lifting or rolling the barrel or package out of the cradle of its support, substantially as specified.

12. In a beer-racking apparatus, the combination with a support for the barrel or package of a swinging frame suspended above said support, and a filling-pipe mounted to reciprocate upon said swinging frame, and a counterbalance and lever for holding said swinging frame to one side, said support being also furnished with rollers upon which the barrel or package directly rests, substantially as specified.

13. In a beer-racking apparatus, the combination with a support for the barrel or package of a swinging frame suspended above said support, and a filling-pipe mounted to reciprocate upon said swinging frame and having a valve at its lower end, a sealing-sleeve surrounding said filling-pipe and mounted to reciprocate on said frame, a supplemental closed vessel or gage connected to said sealing-sleeve and communicating with the interior of the barrel or package, and provided with a vent and safety-valve, said vessel or gage having also a float-valve to close said vent by the rise of the beer or liquid therein, substantially as specified.

14. In a beer-racking apparatus, the combination with a support for the barrel or package of a swinging frame suspended above said support, and a filling-pipe mounted to reciprocate upon said swinging frame and having a valve at its lower end, a sealing-sleeve surrounding said filling-pipe and mounted to reciprocate on said frame, a supplemental closed vessel or gage connected to said sealing-sleeve and communicating with the interior of the barrel or package, and provided with a vent and safety-valve, said vessel or gage having also a float-valve to close said vent by the rise of the beer or liquid therein, and an air-pipe connecting said sealing-sleeve to the upper portion of the tank, substantially as specified.

HARRY W. COLBY.

Witnesses:
L. E. CURTIS,
H. M. MUNDAY.